United States Patent

[11] 3,536,086

| [72] | Inventor | Donald Brown<br>Monroeville, Pennsylvania |
|------|----------|---|
| [21] | Appl. No. | 735,234 |
| [22] | Filed | June 7, 1968 |
| [45] | Patented | Oct. 27, 1970 |
| [73] | Assignee | Westinghouse Air Brake Company<br>Wilmerding, Pennsylvania<br>a corporation of Pennsylvania |

[54] FLUIDIC SAFETY INTERLOCK SYSTEM
6 Claims, 1 Drawing Fig.

[52] U.S. Cl........................................................ 137/81.5
[51] Int. Cl........................................................ F15c 1/12,
F15c 3/02
[50] Field of Search............................................ 137/81.5;
235/201(p.f., cons., m.e.)

[56] References Cited
UNITED STATES PATENTS

| 3,407,828 | 10/1968 | Jones | 137/81.5 |
|---|---|---|---|
| 3,426,582 | 2/1969 | McArthur et al | 137/81.5X |
| 3,429,324 | 2/1969 | Brown et al | 137/81.5 |
| 3,437,100 | 4/1969 | Rona | 137/81.5 |
| 3,443,575 | 5/1969 | Hughes | 137/81.5 |

*Primary Examiner*—Samuel Scott
*Attorneys*—Adelbert A. Steinmiller and Ralph W. McIntire, Jr.

ABSTRACT: A fluidic safety interlock system in which an interface valve for controlling a fluid pressure-operated mechanism dangerous to the limbs of the machine operator is controlled by a plurality of pure fluid devices interconnected between the interface valve and a pair of control valves so that the interface valve is operated to effect a high fluid pressure work stroke of the mechanism only when the control valves are concurrently actuated, and is operated to reset the mechanism preparatory to initiating another work stroke only when the control valves are concurrently deactuated, the control valves being manually operable and so correlatively located that both hands are required to effect concurrent actuation and deactuation thereof.

Patented Oct. 27, 1970 3,536,086
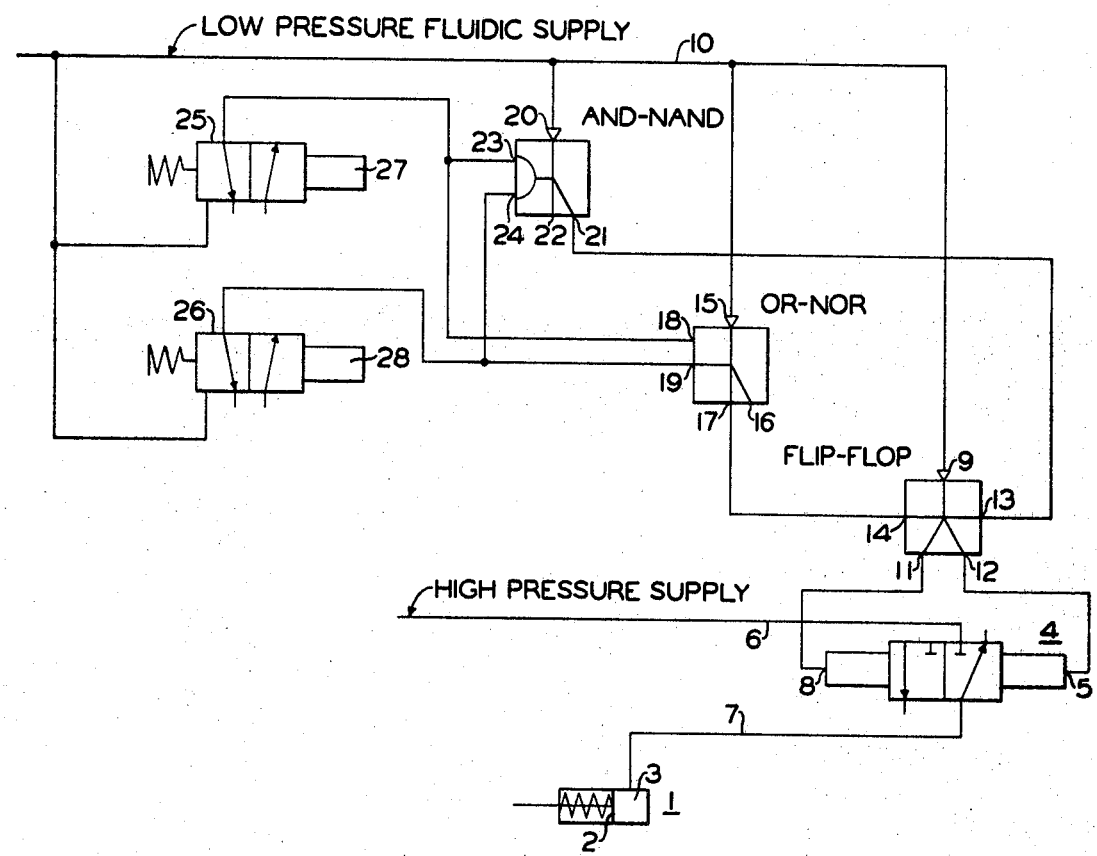
INVENTOR.
DONALD BROWN
BY Ralph W. McIntire, Jr.
ATTORNEY

3,536,086

FLUIDIC SAFETY INTERLOCK SYSTEM

BACKGROUND OF INVENTION

Heretofore, it has been proposed to require a machine operator to use both hands to concurrently actuate two control mechanisms for initiating operation of the machine, thereby assuring that the operator's hands were removed from the danger area before commencement of machine operation. However, these safety arrangements were subject to bypass by the employment of unauthorized devices, such as tape, to hold one of the control valves in a permanently actuated position, thereby defeating the purpose of the safety interlock system.

SUMMARY OF INVENTION

It is the object of the present invention to provide a compact, durable safety interlock system comprised of pure fluid devices requiring the machine operator to employ both hands to concurrently actuate a pair of control valves to effect a work stroke of a machine, and to concurrently deactuate both control valves to reset the machine preparatory to the next work stroke.

In the present invention, this object is achieved by utilizing a pair of manually operable valves, each actuable to communicate pressure to a respective one of a pair of control inputs of a pure fluidic AND-NAND device, and also to a respective one of two control inputs of a pure fluidic OR-NOR device. The AND output of the AND-NAND device and the NOR output of the OR-NOR device are each operable to pressurize a respective one of two control inputs of a pure fluidic FLIP-FLOP device so that the FLIP-FLOP device will switch to pressurize a respective one of its two outputs, thereby disposing an interface valve in a respective one of two control positions. The interface valve is operable in one position to communicate pressure to an operating device, such as the piston chamber of a power cylinder, and is operable in the other position to vent the piston chamber permitting a spring return to reset the piston.

This and other objects will become more readily apparent in the following description, taken in combination with the drawing, in which the single figure is a schematic representation of a fluidic safety interlock system, showing my invention.

Referring now to the drawing, there is shown a power cylinder device 1 having therein a spring-return piston and rod assembly 2 and a piston chamber 3 pressurizable to move the piston against its spring return on a work stroke and ventable to permit spring return or reset of the piston.

In order to alternately pressurize and vent piston chamber 3, there is provided a two-position interface valve device 4 of any commercially available type suitable to control a high fluid pressure supply in response to low fluid pressure control signals in a range commensurate with typical pressures at the outputs of pure fluid devices. In response to control pressure at control input 5, the interface valve assumes a first position, as shown in the drawing, in which a high pressure supply line 6 is closed and a combined delivery and exhaust passage 7 is vented to depressurize piston chamber 3. Conversely, in response to low pressure control at control input 8, the interface valve assumes a second position in which the high pressure supply line 6 is communicated with the combined delivery and exhaust line 7 to pressurize piston chamber 3.

In accordance with the present invention there is provided a fluidic safety interlock system requiring removal of both hands of the machine operator from the danger area of the power cylinder in order for the operator to effect operation of the interface valve 4. This system generally comprises a pure fluidic FLIP-FLOP device directly controlling operation of the interface valve, a pure fluidic AND-NAND device and a pure fluidic OR-NOR device controlling operation of a FLIP-FLOP device, and a pair of manually actuable control valves for operating the fluidic safety interlock system.

The fluidic FLIP-FLOP device is conventional in design and comprises a supply port 9 communicating with a regulated low pressure fluidic supply line 10, a pair of outputs 11, 12 connected to inputs 8 and 5, respectively, of previously described interface valve 4, and a pair of control inputs 13, 14, which when selectively pressurized, effect pressurization of outputs 11, 12, respectively. By virtue of inherent memory, the FLIP-FLOP device will maintain the pressurized output in a pressurized condition even though the actuating one of the control inputs is thereafter depressurized, and until the other one of the control inputs is pressurized.

The fluidic OR-NOR device is conventional in design and comprises a supply port 15 communicated with supply line 10, an OR output 16 communicated with atmosphere, a NOR output 17 connected to input 14 of the FLIP-FLOP device, and a pair of control inputs 18 and 19. The OR output 16 is pressurized when either or both control inputs 18 and 19 are pressurized. Conversely, NOR output 17 is pressurized only when neither input 18 or 19 is pressurized.

The fluidic AND-NAND device is conventional in design and comprises a supply port 20 communicated with supply line 10, an AND output 21 connected to input 13 of the FLIP-FLOP device, a NAND output 22 vented to atmosphere, and a pair of control inputs 23, 24. The AND output 21 is pressurized only when both control inputs 23 and 24 are pressurized. Conversely, NAND output 22 is pressurized when neither or only one of the control inputs 23, 24 is pressurized.

In order to control the application of pressure to the control inputs of the above described AND-NAND and OR-NOR devices, there is provided a pair of identical two-position manually operable control valves 25 and 26, preferably of the type having manually depressible stems 27, 28, respectively, for disposing the respective control valves in a first position, and having spring means biasing the respective valves to a second position, as shown in the drawing, when the respective stems are released. When stem 27 is depressed to dispose control valve 25 in the first position, supply line 10 is communicated simultaneously to input 23 of the AND-NAND device and to input 18 of the OR-NOR device. Similarly, when stem 28 is depressed, control valve 26 is disposed in its first position in which supply line 10 is communicated to input 24 of the AND-NAND device and simultaneously to input 19 of the OR-NOR device. When the control stems 27, 28 are released so that the respective valves 25 and 26 assume the second position, the respective communications effected in the first position are severed.

In order to assure that the purpose of the fluidic safety interlock device is achieved, the pair of control valves 25 and 26 is mounted in any convenient location away from the danger area of the operating device 1 and is spaced apart sufficiently to prevent simultaneous operation of both valves by one hand of the machine operator, and yet provide for convenient concurrent operation of both valves by both hands of the machine operator.

In now describing the operation of the fluidic safety interlock system it will be assumed that low pressure fluidic supply is present in supply line 10, that high pressure supply is present in supply line 6, and that both stems 27, 28 are released thereby disposing control valves 25 and 26 in their second positions, as shown in the drawing. Under these conditions, both inputs of the AND-NAND device and both inputs of the OR-NOR device are depressurized, thereby depressurizing the AND output 21 and pressurizing the NOR output 17. Accordingly, the pressurization of NOR output 17 is effective to pressurize input 14 of the FLIP-FLOP device, thereby pressurizing FLIP-FLOP output 12 and input 5 of the interface valve 4 which assumes the position shown to vent piston chamber 3 of the power cylinder 1 and allow piston 2 to reset to the position shown, preparatory to a power stroke.

If it is now assumed that valve 25 is moved to its first position by manual depression of stem 27, fluidic supply pressure in line 10 is thereby applied to control input 23 of AND-NAND device and also to control input 18 of the OR-NOR device. Accordingly, the AND output 21 of the AND-NAND device remains depressurized, thereby maintaining the control input 13 of the FLIP-FLOP in the previously depressurized condition, and the OR-NOR device switches to depressurize the previously pressurized output 17 thereby depressurizing the previously pressurized control input 14 of the FLIP-FLOP. Since now both control inputs 13 and 14 of the FLIP-FLOP are depressurized, the FLIP-FLOP maintains, by way of inherent memory, the previously established pressurization of output 12 so that the interface valve remains in the position shown to continue venting pressure chamber 3.

By analogy, it is readily seen that if valve 26 is manually actuated to its second position while valve 25 remains in the deactuated or release position, the AND-NAND device, the OR-NOR device, the FLIP-FLOP and the interface valve 4 will assume the same conditions immediately described above, so that the piston chamber 3 remains in the vented condition.

If it is now assumed that both valves 25 and 26 are concurrently disposed in their first positions so as to concurrently pressurize both control inputs of the AND-NAND device and the OR-NOR device, the AND-NAND device switches to pressurize AND output 21 and control input 13 of the FLIP-FLOP device, while the OR-NOR device remains in the previously assumed position to maintain depressurization of NOR output 17 and control input 14 of the FLIP-FLOP device. Accordingly, the FLIP-FLOP switches to pressurize output 11 and depressurize output 12, thereby pressurizing control 8 of the interface valve 4 which switches to a position communicating high pressure supply line 6 to line 7 and piston chamber 3 effecting a work stroke of piston and rod assembly 2.

If now it is assumed that only one of the valves 25, 26 is released to assume its second position, for example, valve 25, the respective control input of the AND-NAND device, in this instance control input 23, is depressurized switching the AND-NAND device to depressurize previously pressurized output 21 and input 13 of the FLIP-FLOP device. At the same time, the respective control input of the OR-NOR device, in this instance control input 18, is depressurized, but has no effect on the previous depressurized condition of NOR output 17 and input 14 of the FLIP-FLOP device. Accordingly, since both control inputs 13 and 14 of the FLIP-FLOP device are depressurized, the FLIP-FLOP device retains its previously established state to maintain pressurization of output 11 and input 8 of the interface valve 4 which remains in its previously established position effecting pressurization of the piston chamber 3. Therefore, the release of only one of the valves 25, 26 will not effect reset of the piston and rod assembly 2.

If it is now assumed that both valves 25 and 26 are released concurrently, the piston chamber 3 is vented to permit reset of the piston and rod assembly 2 in the manner first described above.

From the foregoing, it is seen that the fluidic safety interlock system will permit operation of a work stroke of the operating device only when both hands of the machine operator are used to concurrently operate both control valves 25 and 26. Conversely, the fluidic safety interlock system will prevent reset of the operating device until both valves 25 and 26 are concurrently released.

It will be readily apparent that, if desired, a double-acting cylinder may be substituted for the single-acting cylinder, and the interface valve may be replaced by a suitable valve having connections for venting either end of the double-acting cylinder while pressurizing the other, without requiring modification of the safety interlock system.

I claim:
1. A fluidic safety interlock system, comprising:
   a. first pure fluid means operable to pressurize a respective one of two outputs in response to pressurization of a respective one of two control inputs and to maintain the pressurized output in the pressurized condition when the last pressurized control input is thereafter depressurized and until the other control input is thereafter pressurized;
   b. second pure fluid means having two inputs and operable to pressurize one of said two control inputs of said first pure fluid means only when neither of said two control inputs of said second pure fluid means is pressurized;
   c. third pure fluid means having two control inputs and operable to pressurize the other of said two control inputs of said first fluid means only when said two control inputs of said third pure fluid means are pressurized; and
   d. a pair of individually operative valve devices, each operable in one of two positions to provide communication between a fluid pressure line and a respective one of said two control inputs of both said second and said third pure fluid means, and each operable in the other of said two positions to vent said communication provided in said first position.

2. A fluidic safety interlock system, as recited in claim 1, further including valve means operable to control supply fluid pressure to an operating device in accordance with which of said two outputs of said first pure fluid means is pressurized.

3. A fluidic safety interlock system, as recited in claim 2, in which said valve means assumes one of two positions to communicate supply pressure to said operating device when said respective one of said two outputs of said first pure fluid means is pressurized by pressurization of said one of said two control inputs of said first pure fluid means, and assumes the other of said two positions to depressurize said operating mechanism when the other of said two outputs of said first pure fluid means is pressurized.

4. A fluidic safety interlock system, comprising:
   a. a fluidic FLIP-FLOP device having a pair of control inputs and a pair of outputs;
   b. a fluidic OR-NOR device having a pair of control inputs and having a NOR output communicated with one of said pair of control inputs of said fluidic FLIP-FLOP;
   c. a fluidic AND-NAND device having a pair of control inputs and having an AND output communicated with the other of said pair of control inputs of said fluidic FLIP-FLOP device; and
   d. a pair of individually operative valve devices, each operable in one of two positions to provide communication between a fluid pressure line and a respective control input of both pair of control inputs of each said fluidic AND-NAND device and said fluidic OR-NOR device, and each operable in the other of said two positions to vent said communication.

5. A fluidic safety interlock system, as recited in claim 4, further including an interface valve device operable to control supply fluid pressure to an operating device in accordance with which of said pair of outputs of said fluidic FLIP-FLOP is pressurized.

6. A fluidic safety interlock system, as recited in claim 5, in which pressurization of one of said pair of outputs of said fluidic FLIP-FLOP in response to the pressurization of said other control input of said FLIP-FLOP positions said interface valve in one of two positions to communicate supply pressure to said operating means, and pressurization of the other of said pair of outputs of said fluidic FLIP-FLOP position said interface valve in the other of said two positions to vent said operating device.